US012780111B2

(12) United States Patent
Buck et al.

(10) Patent No.: US 12,780,111 B2
(45) Date of Patent: Nov. 3, 2026

(54) MOTOR VEHICLE COMPRISING A DIGITAL PROJECTION UNIT, AND METHOD FOR OPERATING A MOTOR VEHICLE

(71) Applicant: Bayerische Motoren Werke Aktiengesellschaft, Munich (DE)

(72) Inventors: Alexander Buck, Garching bei Muenchen (DE); Alexander Stuckert, Munich (DE); Rene Uebler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 18/569,280

(22) PCT Filed: Jun. 13, 2022

(86) PCT No.: PCT/EP2022/066037

§ 371 (c)(1),
(2) Date: Dec. 12, 2023

(87) PCT Pub. No.: WO2023/274704

PCT Pub. Date: Jan. 5, 2023

(65) Prior Publication Data

US 2024/0140329 A1 May 2, 2024

(30) Foreign Application Priority Data

Jun. 29, 2021 (DE) ..................... 10 2021 116 678.0

(51) Int. Cl.
*B60R 11/02* (2006.01)
*B60R 11/04* (2006.01)

(52) U.S. Cl.
CPC ...... *B60R 11/0264* (2013.01); *B60R 11/0229* (2013.01); *B60R 11/04* (2013.01);
(Continued)

(58) Field of Classification Search
CPC . B60R 11/0264; B60R 11/0229; B60R 11/04; B60R 2300/302; B60R 2300/304; B60Q 2400/50
See application file for complete search history.

(56) References Cited

U.S. PATENT DOCUMENTS 10,457,199 B2 * 10/2019 Kunii ........................ B60Q 1/04
11,230,223 B1 * 1/2022 Lee ........................... B60Q 1/08
(Continued)

FOREIGN PATENT DOCUMENTS

DE 10 2010 034 853 A1 2/2012
DE 10 2016 002 009 A1 8/2017
(Continued)

OTHER PUBLICATIONS

International Search Report (PCT/ISA/210) issued in PCT Application No. PCT/EP2022/066037 dated Dec. 19, 2022 with English translation (5 pages).
(Continued)

*Primary Examiner* — Peter D Nolan
(74) *Attorney, Agent, or Firm* — Crowell & Moring LLP

(57) ABSTRACT

A motor vehicle includes a digital projection unit for projecting graphical or typographical information onto a projection surface. The digital projection unit is connected to a monitoring circuit to project the graphical or typographical information, evaluate an image recording of the graphical or typographical information, and change the projection of the graphical or typographical information on the projection based on the evaluated image recording. The digital projection unit is configured to readjust the position and/or size and/or distortion of the graphical or typographical information if the evaluation of the image recording results in the projection of the graphical or typographical information on the projection surface changing with respect to at least one
(Continued)

of the representation criteria—position and/or size and/or distortion—compared with target values.

8 Claims, 1 Drawing Sheet

(52) U.S. Cl.
CPC .... *B60Q 2400/50* (2013.01); *B60R 2300/302* (2013.01); *B60R 2300/304* (2013.01)

(56) References Cited

U.S. PATENT DOCUMENTS

| | | | | |
|---|---|---|---|---|
| 11,247,605 | B2 * | 2/2022 | Kunii | B60K 35/60 |
| 11,548,432 | B2 * | 1/2023 | Lee | B60Q 1/08 |
| 12,096,160 | B2 * | 9/2024 | Kim | H04N 9/3194 |
| 12,317,389 | B2 * | 5/2025 | Kim | G06T 5/80 |
| 2007/0176851 | A1 * | 8/2007 | Willey | G03B 21/142 345/32 |
| 2010/0214496 | A1 | 8/2010 | Vogel et al. | |
| 2012/0044090 | A1 | 2/2012 | Kahler et al. | |
| 2014/0028980 | A1 | 1/2014 | Othmer | |
| 2015/0203023 | A1 | 7/2015 | Marti et al. | |
| 2016/0207443 | A1 * | 7/2016 | Widdowson | B60Q 1/0011 |
| 2017/0129389 | A1 * | 5/2017 | Asaoka | G01M 11/068 |
| 2017/0195647 | A1 | 7/2017 | Honkanen et al. | |
| 2018/0118099 | A1 * | 5/2018 | Kunii | B60K 31/0008 |
| 2020/0079280 | A1 * | 3/2020 | Bonne | H05B 45/10 |
| 2020/0231085 | A1 * | 7/2020 | Kunii | B60K 35/60 |
| 2022/0169171 | A1 * | 6/2022 | Lee | B60Q 1/08 |
| 2022/0203895 | A1 * | 6/2022 | Moriyama | B60R 1/002 |
| 2022/0400238 | A1 * | 12/2022 | Kim | H04N 9/3194 |
| 2023/0164896 | A1 * | 5/2023 | Kim | G06V 10/141 315/77 |
| 2024/0087491 | A1 * | 3/2024 | Jiang | B60K 35/81 |
| 2024/0118597 | A1 * | 4/2024 | Yargeldi | G02B 27/0961 |
| 2024/0278714 | A1 * | 8/2024 | Sasaki | B62D 15/0285 |

FOREIGN PATENT DOCUMENTS

| | | | |
|---|---|---|---|
| DE | 10 2018 218 038 | A1 | 4/2020 |
| WO | WO 2020/262445 | A1 | 12/2020 |

OTHER PUBLICATIONS

German-language Written Opinion (PCT/ISA/237) issued in PCT Application No. PCT/EP2022/066037 dated Dec. 19, 2022 with English translation (12 pages).

German Search Report issued in German Application No. 10 2021 116 678.0 dated Feb. 28, 2022 with partial English translation (7 pages).

* cited by examiner

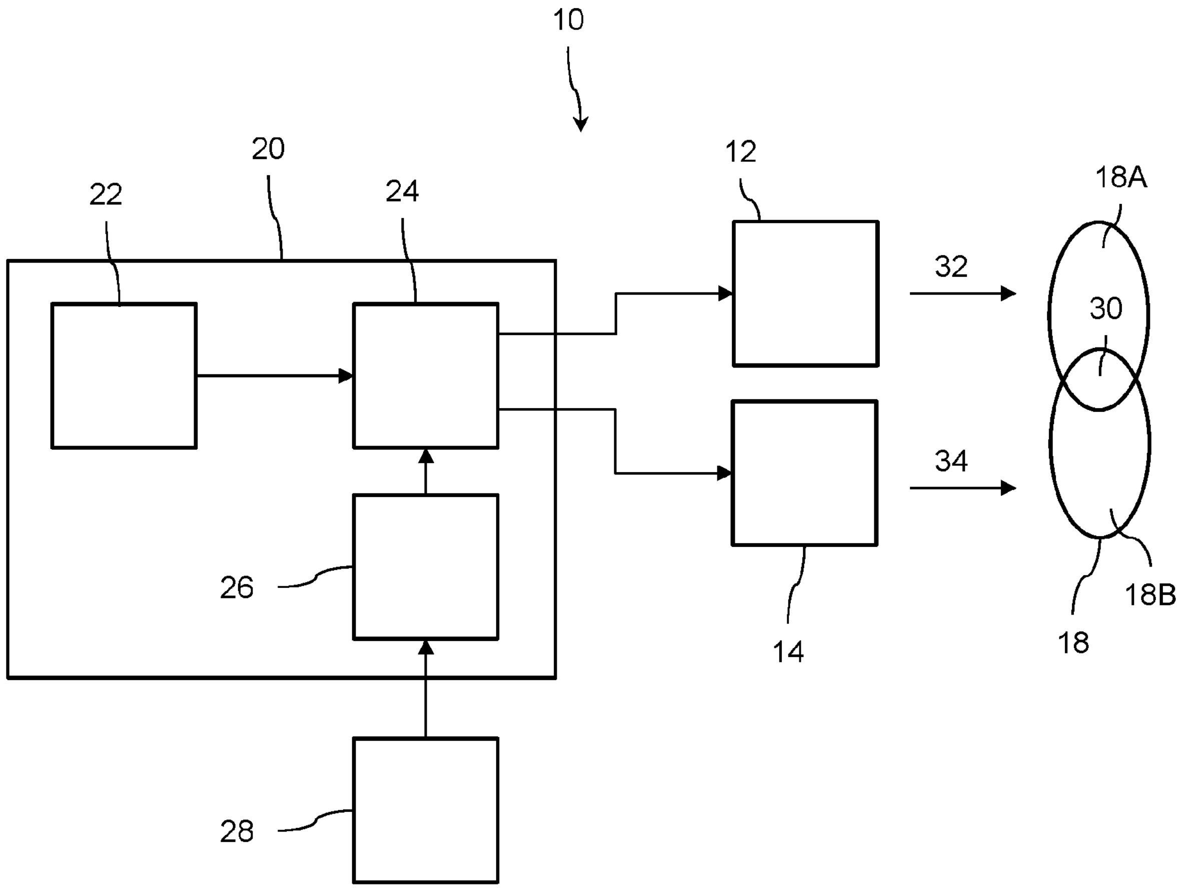
10
20
22
24
12
18A
32
30
34
26
14
18B
18
28

MOTOR VEHICLE COMPRISING A DIGITAL PROJECTION UNIT, AND METHOD FOR OPERATING A MOTOR VEHICLE

BACKGROUND AND SUMMARY

The present invention relates to a motor vehicle having at least one digital projection unit for projecting graphical or visual information onto a projection surface. The at least one digital projection unit is connected to a monitoring circuit of the motor vehicle in order to project the graphical or visual information, to evaluate a snapshot of the graphical or visual information and to change the projection of the graphical or visual information on the projection surface by way of the digital projection unit based on the evaluated snapshot. The invention furthermore relates to a method for operating such a vehicle.

Such a motor vehicle is known for example from DE 10 2010 034 853 A1. In this known motor vehicle, the projector is connected to a monitoring circuit of the motor vehicle in order to project information determined by the monitoring circuit in real time as the graphical or visual information. Any information that would conventionally be displayed on a dashboard of the motor vehicle may be considered as such information. A road surface, a wall or the like is in particular used as projection surface. A headlight and/or at least one rear light of the motor vehicle are designed as digital projectors in order to make the determined information visible on the area onto which the light shines. Devices for recording the brightness of the projection surface and for controlling the light intensity with which the graphical or visual information is projected, based on the recorded brightness, promote the reliable perception of the projected information by the driver. Depending on the distance of the projection surface from the projector and on the reflectiveness of the projection surface, good recognizability should thus be ensured. A camera for recognizing road signs, in connection with an image evaluation system for the images delivered by the camera, is provided for recording the brightness.

The abovementioned procedure is based on the driver of the motor vehicle being able to recognize the projection. In digital surroundings projections in motor vehicles, the projectors are at present set once when the motor vehicle is assembled and not changed any further thereafter. Deviations in the projection may occur over the lifetime of the motor vehicle, these deviations being undesirable and impairing either the overall impression or the recognizability of the projection.

One object of the invention is to specify a motor vehicle in which an installed digital projection unit enables a projection that does not exhibit any quality losses over the lifetime and the use of the motor vehicle.

A further object is to specify a method for operating a motor vehicle having a projection unit according to the invention.

The objects are achieved by a motor vehicle having at least one digital projection unit for projecting graphical or visual information onto a projection surface, wherein the at least one digital projection unit is connected to a monitoring circuit of the motor vehicle in order to project the graphical or visual information, to evaluate a snapshot of the graphical or visual information and to change the projection of the graphical or visual information on the projection surface by way of the digital projection unit based on the evaluated snapshot. Any information that has a lighting effect, such as for example a manufacturer logo, may be considered as information. Information that would usually be displayed on a display device of the motor vehicle may also be considered as information.

The digital projection unit is designed to readjust the position and/or size and/or distortion of the graphical or visual information when the evaluation of the snapshot has the result that the projection of the graphical or visual information on the projection surface has changed compared to respective reference values in relation to at least one of the display criteria position and/or size and/or distortion.

The readjustment of the projection of the graphical or visual information in relation to one or more of the display criteria position and/or size and/or distortion takes into consideration the fact that deviations in the projection may occur over the lifetime of the motor vehicle, and so at least one of the display criteria changes. Such deviations may arise for example through even slight mechanical changes in the position of the projection unit, which may result for example from continued vibrations during operation of the vehicle.

The motor vehicle according to embodiments of the invention takes advantage here of the fact that digital projection units have the option of orienting the information that they project within certain limits. The position and/or size and/or distortion of the graphical or visual information may thus be adapted by digitally shifting or scaling the content to be displayed, provided this stays within an overall projection area. To this end, in the delivery state of the motor vehicle, the maximum possible theoretical projection area is expediently not fully exhausted in order to enable subsequent digital readjustments to the projection.

To this end, it is expedient when the monitoring circuit is designed to project a test image, which is evaluated as snapshot, onto the projection surface by way of the at least one projection unit. According to this embodiment, the digital projection unit, for a specific, in particular short period, produces a digital test image, which is recorded by an image recording unit, for example a camera, and is supplied to the monitoring circuit. The monitoring circuit then determines whether the snapshot of the test image has the result that the projection of the information of the test image on the projection surface has changed compared to respective reference values in relation to at least one of the display criteria position and/or size and/or distortion. This makes it possible to identify for example whether a distance and/or an orientation of the projection with respect to the vehicle or the size of the projection has changed. If the motor vehicle has two or more projection units, which for example produce the same projection on different sides, then it is possible to identify whether there is a symmetry problem with regard to the multiple projections.

Provision is expediently made that the graphical or visual information is produced by at least two digital projection units that each project a partial image. The partial images may in particular at least partially overlap. As an alternative, the partial images may also adjoin one another, wherein the two partial images may be separated from one another by a gap. The two partial images may also adjoin one another such that they supplement one another and give the impression of a single image or of a single item of visual information to an observer. In these cases, a deviation of one of the partial images from a reference specification is particularly noticeable, since, in the case of an overlap, blurry projections may occur in the region of overlap. If the partial images supplement one another, a deviation in the projection leads visibly to the perception that the graphical or visual information is composed.

A further expedient embodiment makes provision that the snapshot is produced by at least one camera of the motor vehicle. Any camera installed in the motor vehicle may in principle be considered, such as for example in an exterior mirror, in the front windscreen, on the rear (reversing camera), etc. Using the one or more cameras present in the motor vehicle, the graphical or visual information produced on the projection surface is able to be recorded and compared with for example stored reference values in order to identify whether at least one of the display criteria position and/or size and/or distortion has changed compared to the respective reference values.

The motor vehicle according to embodiments of the invention may however also be designed to read in the snapshot from a user terminal. The described procedure may thereby also be used in motor vehicles that do not have their own vehicle camera. The user terminal may be for example a smartphone, a tablet PC and the like. The snapshot captured by the user terminal is read in by the motor vehicle via a (contact-based or wireless) interface, wherein the monitoring unit then carries out the determination described above as to whether the projection of the graphical or visual information on the projection surface has changed compared to respective reference values in relation to at least one of the display criteria position and/or size and/or distortion.

The invention furthermore proposes a method for operating a motor vehicle as described above. The method comprises the steps of evaluating the snapshot and readjusting the position and/or size and/or distortion of the graphical or visual information by way of the digital projection unit when the evaluation of the snapshot has the result that the projection of the graphical or visual information on the projection surface has changed compared to respective reference values in relation to at least one of the display criteria position and/or size and/or distortion. The method has the same advantages as have been described above in connection with the motor vehicle according to embodiments of the invention.

In one expedient embodiment of the method, the monitoring circuit projects a test image, which is evaluated as snapshot, onto the projection surface by way of the at least one digital projection unit.

In a further expedient embodiment, the graphical or visual information is produced by at least two digital projection units that each project a partial image.

The step of readjusting the position and/or size and/or distortion of the graphical or visual information comprises calculating how at least one of the display criteria position and/or size and/or distortion should be changed so as to achieve respective reference values. Appropriate control parameters are derived therefrom and then used to digitally readjust or digitally correct the projection by way of the digital projection unit.

The invention is described in more detail below on the basis of an exemplary embodiment with reference to the accompanying FIGURE.

BRIEF DESCRIPTION OF THE DRAWINGS

FIG. 1 shows a schematic illustration of a motor vehicle according to an embodiment of the invention.

DETAILED DESCRIPTION OF THE DRAWINGS

FIG. 1 shows a schematic block diagram of a motor vehicle 10 according to an embodiment of the invention. In the illustrated exemplary embodiment, the motor vehicle 10 comprises a first digital projection unit 12, a second digital projection unit 14 and a monitoring circuit 20. Each of the digital projection units 12, 14 comprises a unit for outputting graphical or visual information, for example in the form of a projector or a microlens array. The first and the second digital projection unit 12, 14 may have identical technical structures. The first and the second digital projection unit 12, 14 may however also have different structures. The monitoring circuit 20 comprises a computing unit 24 and a camera 22. In the present exemplary embodiment, the monitoring circuit 20 furthermore comprises an optional communication interface 26 for communication with an external user terminal. The external user terminal comprises an external camera 28 (in addition to further components that are not shown).

The projection unit, which comprises the first digital projection unit 12 and the second digital projection unit 14 in the present exemplary embodiment, produces graphical or visual information on a projection surface 18. The graphical or visual information may be a manufacturer logo. As an alternative, the graphical or visual information may be any information that would usually be displayed on a display unit (not illustrated) of the motor vehicle 10. The projection surface 18 is located for example at a defined distance from the vehicle when the projection of the graphical or visual information is produced on the ground next to, in front of or behind the vehicle. The projection surface may however also be a wall, for example a garage wall.

Depending on the information to be projected by the projection units 12, 14 onto the projection surface 18, the first and the second digital projection unit 12, 14 may be installed in suitable components of the motor vehicle, such as for example an exterior mirror, a door sill or any other component. The first and the second digital projection unit 12, 14 may in particular also be integrated in the region of the front, for example into the headlight, or provided in the region of the rear.

In the present exemplary embodiment, the first digital projection unit 12 in this case produces first partial information of the graphical or visual information, which first partial information is projected in a first subarea 18A of the projection surface 18. The direction of light propagation of the graphical or visual partial information output by the first digital projection unit 12 is identified with the reference sign 32. In a corresponding manner, the second digital projection unit 14 projects second partial information of the graphical or visual information, which second partial information is projected in a second subarea 18B of the projection surface 18. The direction of light propagation of the graphical or visual partial information output by the second projection unit 12, 14 is identified with the reference sign 34.

As may be seen in FIG. 1, the first and the second subarea 18A, 18B have a region of overlap 30, meaning that there is a need for the projections of the first and the second digital projection unit to be oriented precisely with respect to one another such that a clear, crisp image is produced in the region of overlap. In one alternative embodiment that is not illustrated, the first and the second subareas 18A, 18B do not need to overlap; they may for example be in contact with one another or adjoin one another (with or without a gap).

The computing unit 24 of the monitoring circuit 20 is designed to evaluate a snapshot of the graphical or visual information that is produced by the digital projection units 12, 14 on a projection surface 18. For this purpose, the computing unit 24 of the monitoring circuit 20 may optionally access a snapshot from the camera 22 internal to the vehicle or from the external camera 28. As an alternative, image evaluations from both the camera 22 internal to the vehicle and the camera 28 external to the vehicle may also be processed.

Evaluating the snapshot captured by way of the camera 22 and/or the camera 28 external to the vehicle then allows the computing unit 24 of the monitoring circuit 20 to determine whether the projection of the graphical or visual information on the projection surface 18 is correct or has changed (over the lifetime of the motor vehicle) in relation to predefined display criteria. Relevant display criteria are a respective position of the projection of the first subarea and the second subarea 18A, 18B and/or a respective size and/or a respective distortion of the partial information displayed in the subareas 18A, 18B.

If the evaluation of the snapshot reveals that the projection of the graphical or visual information, overall or in one of the items of partial information that is output on the respective first or second subareas 18A, 18B, has changed compared to a reference projection, then a recalculation takes place as to how the projection should be readjusted in order to correspond to respective reference values in relation to position and/or size and/or distortion. After the computing unit 24 has determined appropriate correction parameters, the position and/or size and/or distortion of the graphical or visual information is readjusted in the projection region 18 as a whole or only a respective item of partial information is readjusted, which leads to respective changes in the first and/or second subarea 18A, 18B.

In technical terms, this may be achieved for example by virtue of digital projection units being capable of adapting the position of the graphical or visual information to be produced by digitally shifting the content to be displayed, provided that the shift takes place within a technically possible overall projection area. Accordingly, when assembling the vehicle, the projector, which comprises the first and the second digital projection unit 12, 14, is set such that the maximum possible technical display region is not utilized. This provides scope for correcting possible deviations over the lifetime of the vehicle through digital readjustment.

A digital test image, which is transmitted to the first and the second digital projection unit 12, 14 for a predefined period by the computing unit as information to be output, is preferably used as snapshot. Then, as described, the snapshot captured by way of the camera 22 internal to the vehicle and/or camera 28 external to the vehicle is evaluated, and an evaluation is then carried out by the computing unit 24 of the monitoring circuit 20. The computing unit then possibly calculates required correction parameters, such that display criteria with regard to position and/or size and/or distortion of respective partial images are satisfied.

In a further variant embodiment that is not illustrated, the described procedure may also be used in a motor vehicle that has only a single projection unit. A change in the projection may for example arise when the projection changes its distance and/or its orientation with respect to the vehicle over time.

In a further variant configuration that is not illustrated, the two subareas 18A, 18B of the by way of example two projection units 12, 14 also do not need to be related in terms of content. By way of example, the first digital projection unit 12 could thus display first information on a first subarea to the left of the vehicle and the second digital projection unit 14 could display second, for example identical information on a second subarea to the right of the vehicle. In the event of symmetry problems occurring, which may occur due to a corresponding image evaluation, for example due to changing distances from the vehicle or changing sizes and/or the occurrence of distortion in one of the two subareas, a digital readjustment may then be performed in the described form.

LIST OF REFERENCE SIGNS

10 motor vehicle
12 first digital projection unit
14 second digital projection unit
18 projection surface
18A first subarea
18B second subarea
20 monitoring circuit
22 camera
24 computing unit
26 communication interface
28 external camera
30 region of overlap of the first and second subareas 18A, 18B
32 direction of light propagation of the projection unit 12
34 direction of light propagation of the projection unit 14

The invention claimed is:

1. A motor vehicle comprising:

at least two digital projection units for projecting graphical or visual information onto a projection surface, wherein:

each of the at least two digital projection units is connected to a monitoring circuit of the motor vehicle in order to project a respective partial image of the graphical or visual information, to evaluate a snapshot of the graphical or visual information and to change the projection of its respective partial image on the projection surface based on the evaluated snapshot, and each of the at least two digital projection units is configured to readjust at least one of a position, a size, or a distortion of its respective partial image by digitally shifting or scaling content to be displayed when an evaluation of the snapshot has a result that the projection of the graphical or visual information on the projection surface has changed compared to respective reference values in relation to at least one of the position, the size, or the distortion.

2. The motor vehicle according to claim 1, wherein the monitoring circuit is configured to project a test image, which is evaluated as the snapshot, onto the projection surface by way of the at least two digital projection units.

3. The motor vehicle according to claim 1, wherein the partial images at least partially overlap.

4. The motor vehicle according to claim 1, wherein the partial images adjoin one another.

5. The motor vehicle according to claim 1, wherein the snapshot is produced by at least one camera of the motor vehicle.

6. The motor vehicle according to claim 1, wherein the snapshot is read in from a user terminal.

7. A method for operating a motor vehicle having at least two digital projection units for projecting graphical or visual information onto a projection surface, wherein each of the at least two digital projection units is connected to a monitoring circuit of the motor vehicle in order to project a respective partial image of the graphical or visual information, to evaluate a snapshot of the graphical or visual information and to change the projection of its respective partial image on the projection surface based on the evaluated snapshot, the method comprising:

evaluating the snapshot; and readjusting at least one of a position, a size, or a distortion of one or more of the respective partial images by digitally shifting or scaling content to be displayed when an evaluation of the snapshot has a result that the projection of the graphical or visual information on the projection surface has changed compared to respective reference values in relation to at least one of the position, the size, or the distortion.

8. The method according to claim 7, wherein the monitoring circuit projects a test image, which is evaluated as the snapshot, onto the projection surface by way of the at least two digital projection units.

* * * * *